United States Patent
Giger

(10) Patent No.: US 11,856,043 B2
(45) Date of Patent: Dec. 26, 2023

(54) MANAGING DATA TRANSMISSIONS OVER A NETWORK CONNECTION

(71) Applicant: eBay Inc., San Jose, CA (US)

(72) Inventor: Matthew Lee Giger, Portland, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/835,426

(22) Filed: Jun. 8, 2022

(65) Prior Publication Data

US 2022/0303329 A1 Sep. 22, 2022

Related U.S. Application Data

(63) Continuation of application No. 17/220,259, filed on Apr. 1, 2021, now Pat. No. 11,388,213, which is a
(Continued)

(51) Int. Cl.
*H04N 21/442* (2011.01)
*H04N 21/472* (2011.01)
(Continued)

(52) U.S. Cl.
CPC .......... *H04L 65/75* (2022.05); *H04L 41/0896* (2013.01); *H04L 43/0894* (2013.01); *H04L 65/612* (2022.05); *H04L 65/80* (2013.01); *H04L 67/01* (2022.05); *H04L 67/02* (2013.01); *H04L 67/125* (2013.01); *H04L 67/53* (2022.05); *H04N 7/17318* (2013.01); *H04N 21/2385* (2013.01);
(Continued)

(58) Field of Classification Search
None
See application file for complete search history.

(56) References Cited

U.S. PATENT DOCUMENTS

| 8,397,153 B1 | 3/2013 | Lee et al. |
| 9,183,319 B2 | 11/2015 | Joel et al. |

(Continued)

FOREIGN PATENT DOCUMENTS

| CN | 101288303 A | 10/2008 |
| CN | 101729160 A | 6/2010 |

(Continued)

OTHER PUBLICATIONS

Final Office Action received for U.S. Appl. No. 15/152,442, dated Oct. 25, 2018, 10 pages.

(Continued)

*Primary Examiner* — Scott B Christensen
(74) *Attorney, Agent, or Firm* — Shook, Hardy & Bacon L.L.P.

(57) ABSTRACT

In various example embodiments, a system and method for managing media bandwidth usage are disclosed. One disclosed method includes determining a network connection state of a computing device, receiving a request that requests media content, altering the request to request a synthetic representation of the media content instead of the media content in response to the network connection state being one of a set of predefined network connection states and the media content violating one or more restrictions of the network connection state, and requesting the media content in response to a user selecting the synthetic representation.

18 Claims, 9 Drawing Sheets

Related U.S. Application Data continuation of application No. 16/722,427, filed on Dec. 20, 2019, now Pat. No. 10,999,341, which is a continuation of application No. 15/152,442, filed on May 11, 2016, now Pat. No. 10,554,714.

(51) Int. Cl.

| | | |
|---|---|---|
| H04N 21/462 | (2011.01) | |
| H04L 43/0894 | (2022.01) | |
| H04L 67/125 | (2022.01) | |
| H04L 67/02 | (2022.01) | |
| H04L 65/612 | (2022.01) | |
| H04L 67/01 | (2022.01) | |
| H04L 67/53 | (2022.01) | |
| H04N 21/262 | (2011.01) | |
| H04L 41/0896 | (2022.01) | |
| H04L 65/80 | (2022.01) | |
| H04N 7/173 | (2011.01) | |
| H04N 21/2385 | (2011.01) | |
| H04N 21/2662 | (2011.01) | |
| H04N 21/81 | (2011.01) | |
| H04N 21/858 | (2011.01) | |
| H04L 67/12 | (2022.01) | |
| H04L 65/75 | (2022.01) | |

(52) U.S. Cl.
CPC ... *H04N 21/2662* (2013.01); *H04N 21/26216* (2013.01); *H04N 21/44209* (2013.01); *H04N 21/4621* (2013.01); *H04N 21/472* (2013.01); *H04N 21/812* (2013.01); *H04N 21/858* (2013.01); *H04L 67/12* (2013.01)

(56) References Cited

U.S. PATENT DOCUMENTS

| | | | |
|---|---|---|---|
| 9,679,075 B1* | 6/2017 | Kolam | H04L 67/02 |
| 9,819,937 B1 | 11/2017 | Helter et al. | |
| 11,138,287 B1 | 10/2021 | Botero | |
| 2002/0059458 A1* | 5/2002 | Deshpande | H04L 67/02 |
| | | | 709/219 |
| 2006/0020714 A1 | 1/2006 | Girouard et al. | |
| 2007/0080830 A1 | 4/2007 | Sacks | |
| 2010/0306643 A1 | 12/2010 | Chabot et al. | |
| 2011/0169732 A1 | 7/2011 | Sircar et al. | |
| 2012/0007866 A1* | 1/2012 | Tahan | H04N 21/23439 |
| | | | 345/428 |
| 2012/0192080 A1 | 7/2012 | Lloyd | |
| 2013/0151937 A1 | 6/2013 | Weber et al. | |
| 2013/0251261 A1* | 9/2013 | Blum | H04N 19/187 |
| | | | 382/176 |
| 2014/0047413 A1 | 2/2014 | Sheive et al. | |
| 2014/0171205 A1 | 6/2014 | Morrison et al. | |
| 2014/0317532 A1 | 10/2014 | Ma et al. | |
| 2014/0373173 A1 | 12/2014 | Baker, II | |
| 2015/0244833 A1* | 8/2015 | Grue | G06F 16/957 |
| | | | 709/219 |
| 2015/0365491 A1* | 12/2015 | Chan | H04N 21/4335 |
| | | | 709/219 |
| 2016/0127749 A1 | 5/2016 | Chowdhury et al. | |
| 2017/0310791 A1 | 10/2017 | Palse et al. | |
| 2017/0331870 A1 | 11/2017 | Giger | |
| 2020/0169589 A1 | 5/2020 | Giger | |
| 2021/0227012 A1 | 7/2021 | Giger | |

FOREIGN PATENT DOCUMENTS

| | | |
|---|---|---|
| CN | 102823225 A | 12/2012 |
| CN | 202872968 U | 4/2013 |
| CN | 103227775 A | 7/2013 |
| CN | 103748530 A | 4/2014 |
| CN | 104169899 A | 11/2014 |
| CN | 104755879 A | 7/2015 |
| CN | 104838386 A | 8/2015 |
| CN | 105103149 A | 11/2015 |
| WO | 2013138370 A1 | 9/2013 |
| WO | 2017197135 A1 | 11/2017 |

OTHER PUBLICATIONS

First Action Interview—Office Action Summary received for U.S. Appl. No. 15/152,442, dated Mar. 2, 2018, 5 pages.

International Preliminary Report on Patentabililty received for PCT Application No. PCT/US2017/032194, dated Nov. 22, 2018, 7 pages.

International Search Report received for PCT Application No. PCT/US2017/032194, dated Aug. 1, 2017, 2 pages.

Non Final Office Action Received for U.S. Appl. No. 16/722,427, dated Sep. 30, 2020, 6 pages.

Non-Final Office Action received for U.S. Appl. No. 15/152,442, dated Apr. 18, 2019, 10 pages.

Non-Final Office Action received for U.S. Appl. No. 17/220,259, dated Nov. 23, 2021, 12 pages.

Notice of Allowance received for U.S. Appl. No. 15/152,442, dated Sep. 20, 2019, 12 pages.

Notice of Allowance received for U.S. Appl. No. 16/722,427, dated Jan. 25, 2021, 5 pages.

Notice of Allowance received for U.S. Appl. No. 17/220,259, dated Mar. 10, 2022, 13 pages.

Office Action received for Chinese Patent Application No. 201780035963.7, dated Aug. 30, 2021, 10 pages (9 pages of official copy and 1 page of English translation).

Office Action received for Chinese Patent Application No. 201780035963.7, dated Jan. 18, 2022, 7 pages (official copy only).

Osxdaily, "Stop Images Loading Automatically in Mail for iOS to Reduce Data Usage & Speed Up Email", available at <http://osxdaily.com/2013/05/09/stop-images-loading-automatically-mail- - ios>, Accessed on Feb. 7, 2019, 5 pages.

Preinterview first Office Action mailed for U.S. Appl. No. 15/152,442, dated Dec. 15, 2017, 5 pages.

PTO Response to Rule 312 Communication Received for U.S. Appl. No. 15/152,442, dated Nov. 6, 2019, 2 pages.

Sharma, "Images as Links", <https://sites.google.com/site/siteshelphowtos/google-sitesinstruction-s/images/imagesaslinks>, Mar. 25, 2012, 3 pages.

Stackoverflow, "Hover and click event on mobile devices", Retrieved fmm the Internet: <https://stackoverflow.com/questions/12186892/hover-and-click-event-on-mobile-devices>, last accessed on Jan. 24, 2020, Aug. 29, 2012, 3 pages.

Tardioli et al., "Visual Data Association in Narmw-Bandwidth Networks", 2015 IEEE/RSJ International Conference on Intelligent Robots and Systems (IROS), Sep. 28-Oct. 2, 2015, pp. 2572-2577.

Written Opinion received for PCT Application No. PCT/US2017/032194, dated Aug. 1, 2017, 5 pages.

Office Action Received for Chinese Patent Application No. 201780035963.7, dated Jun. 20, 2022, 8 pages (1 Page of English Translation & 7 Pages of Official Copy).

Networking architectures for healthcare wireless sensor networks comparison of architectures used for remote patient monitoring, In 2013 11th RoEduNet International Conference, IEEE, 6 Pages.

Notice of Decision to Grant received for Chinese Patent Application No. 201780035963.7 dated Jan. 5, 2023, 4 Pages (2 Pages of English Translation & 2 Pages of Official Copy).

* cited by examiner

US 11,856,043 B2

MANAGING DATA TRANSMISSIONS OVER A NETWORK CONNECTION

CROSS REFERENCES

This application is a continuation of U.S. patent application Ser. No. 17/220,259 by Giger, entitled "Managing Data Transmissions Over a Network Connection," filed Apr. 1, 2021; which is a continuation of U.S. patent application Ser. No. 16/722,427 by Giger, entitled "Managing Data Transmissions Over a Network Connection," filed Dec. 20, 2019, now U.S. Pat. No. 10,999,341, issued May 4, 2021; which is a continuation of U.S. patent application Ser. No. 15/152,442 by Giger, entitled "Managing Data Transmissions Over a Network Connection," filed May 11, 2016, now U.S. Pat. No. 10,554,714, issued Feb. 4, 2020; each of which is hereby incorporated by reference in its entirety.

TECHNICAL FIELD

Embodiments of the present disclosure relate generally to electronic transmission of media content and, more particularly, but not by way of limitation, to managing data transmission over a network connection to limit bandwidth usage.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a system is configured to determine a network connection state of a computing device. A network connection state as described herein includes at least a state or condition of a network connection between the computing device and another computing device, as will be further described in later paragraphs. In one example, the network connection state is based, at least in part, on a network transmission speed limitation of the network connection.

The system may then receive a request (e.g., from a user) for media content from a remote system. The system, in one example embodiment, alters the request to request a synthetic representation of the media content instead of the media content in response to the network connection state being one of a set of predefined network connection states and the media content violating one or more restrictions of the network connection state. In certain embodiments, a synthetic representation is an alternate media object that represents the requested media content. In one example embodiment, the alternate media object consumes less bandwidth than the requested media content.

In one example, in response to limited network bandwidth, the system may alter a request for media content that exceeds a certain size so that a smaller synthetic representation of the media content is transmitted. In this way, the user of the system may not need to wait for transmission of the media content to interact with the system.

In other embodiments, the system determines when to transmit the originally requested media content in response to interaction with the user, as will be further described. In one example, in response to the user selecting the synthetic representation, the system requests the media content.

Figure 1:
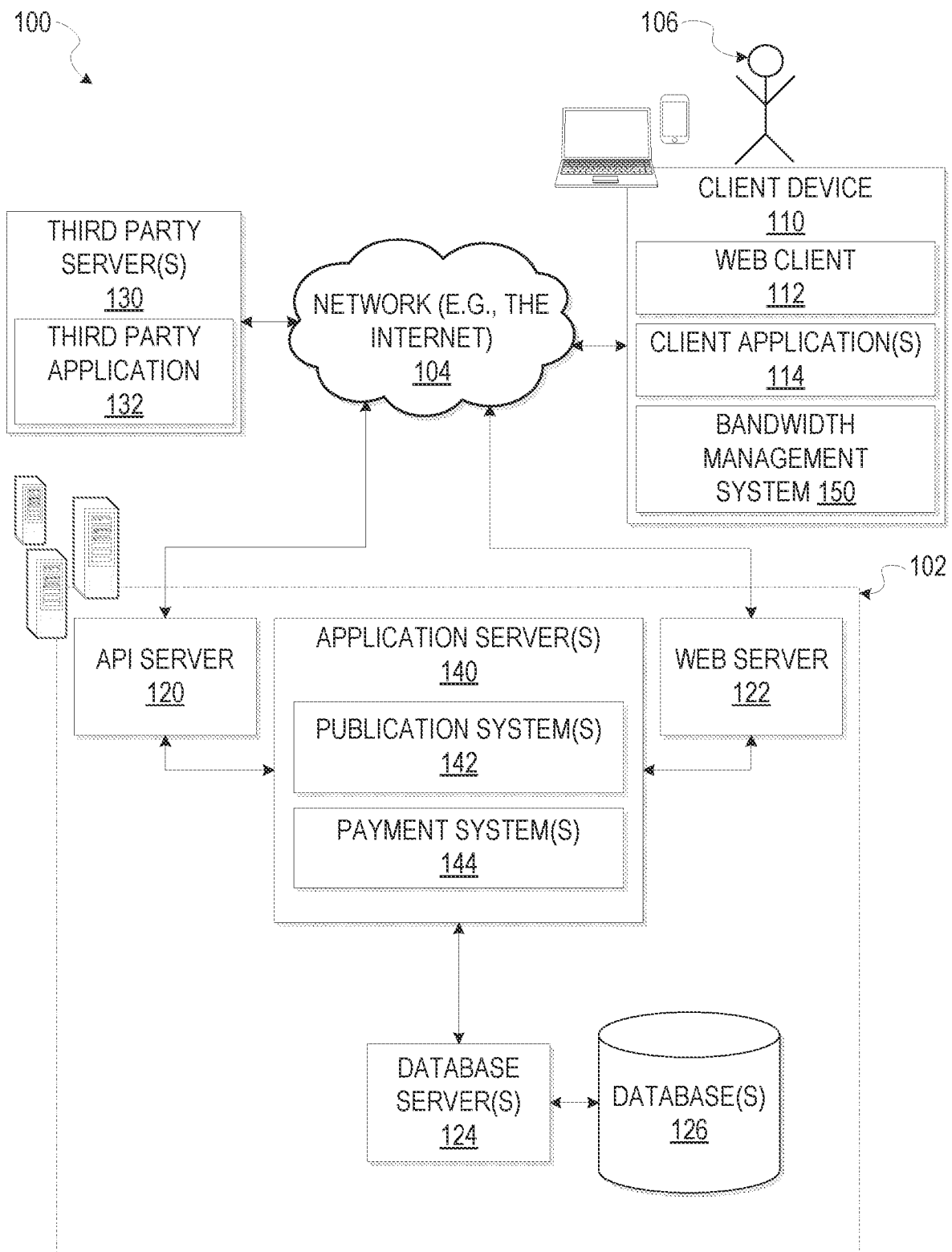
FIG. 1 is a block diagram illustrating a networked system, according to some example embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or a wide area network (WAN)) to one or more client devices 110. FIG. 1 illustrates, for example, a web client 112 (e.g., a browser, such as the Internet Explorer® browser developed by Microsoft® Corporation of Redmond, Washington State), client application(s) 114, and a bandwidth management system 150, as will be further described, executing on the client device 110.

The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronics, game console, set-top box, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital products within the networked system 102. In one embodiment, the networked system 102 is a network-based marketplace that responds to requests for product listings, publishes publications comprising product listings of products available on the network-based marketplace, and manages payments for these marketplace transactions.

One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, e-commerce site application (also referred to as a marketplace application), and the like. In some embodiments, if the e-commerce site application is included in a given client device 110, then this application is configured to locally provide the user interface and at least some of the functionalities of the e-commerce site, with the application configured to communicate with the networked system 102, on an as needed basis, for data and/or processing capabilities not locally available (e.g., access to a database of products available for sale, to authenticate a user, to verify a method of payment, etc.). Conversely, if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application server(s) 140. The application server(s) 140 may host one or more publication systems 142 and payment systems 144, each of which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information (e.g., publications or listings) to be posted to the publication system(s) 142. The database(s) 126 may also store digital product information, in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 may provide a number of publication functions and services to users 106 that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

In one example embodiment, the bandwidth management system 150 provides functionality operable to determine a network connection state of the client device 110, receive a request for media content via a network connection, alter the request to request a synthetic representation of the media content instead of the media content in response to the network connection state being one of a set of predefined network connection states and the media content violating one or more restrictions of the network connection state, and request the media content in response to the user 106 selecting the synthetic representation.

In another example embodiment, the synthetic representation is a generic image. In one example, the media content is an image of an automobile and the synthetic representation is a generic image of an automobile. In one example, the generic image is stored on the client device 110 so that the client device 110 may display the generic image without transmitting the media content over the network connection.

In another example embodiment, the synthetic representation includes a text overlay providing information about the requested media content. In one example embodiment, the text overlay includes at least one of a size of the media content, an estimated time to transmit the media content, an estimated cost to transmit the media content, a category of the media content, and a property of a product represented by the media content. Of course, the information may include other properties of the requested media content, and this disclosure is not limited in this regard.

In one example embodiment, the synthetic representation includes an indicated portion of the synthetic representation, the bandwidth management system 150 following a link associated with the media content in response to the user 106 selecting a non-indicated portion of the synthetic representation. In this example embodiment, the user 106 may download the media content by selecting the indicated portion or may alternatively follow a link associated with the media content without transmitting the media content over the network connection.

In another example embodiment, the bandwidth management system 150 follows a link associated with the media content in response to the user 106 selecting the synthetic representation a second time. In one example embodiment, the media content is a video and the bandwidth management system 150 alters a request for the video to a request for an animated image wherein at least one frame of the animated image includes an informational text overlay.

In another example embodiment, the network connection state is one of bandwidth capabilities below a threshold value, bandwidth restrictions below a threshold value, metered bandwidth, disallowed media types, and user restrictions, as will be further described.

In another example embodiment, the user 106 may use a first gesture type to select the synthetic representation and a second gesture type to perform an action associated with the media content. In one example, a single click causes transmission of the media content to the client device 110 while a double click causes the bandwidth management system 150 to follow a link associated with the media content. In this way, the user 106 may choose whether to download the media content or may alternatively interact with the networked system 102 without causing download of the media content.

While the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and bandwidth management system 150 could also be implemented as standalone software programs, which do not necessarily have networking capabilities.

The web client 112 may access the various publication and payment systems 142 and 144 via the web interface supported by the web server 122. Similarly, the bandwidth management system 150 may communicate with the networked system 102 via a programmatic client. The programmatic client accesses the various services and functions provided by the publication and payment systems 142 and 144 via the programmatic interface provided by the API server 120. The programmatic client may, for example, be a seller application (e.g., the Turbo Lister application developed by eBay® Inc., of San Jose, California) to enable sellers to author and manage listings on the networked system 102 in an offline manner, and to perform batch-mode communications between the programmatic client and the networked system 102.

Figure 2:
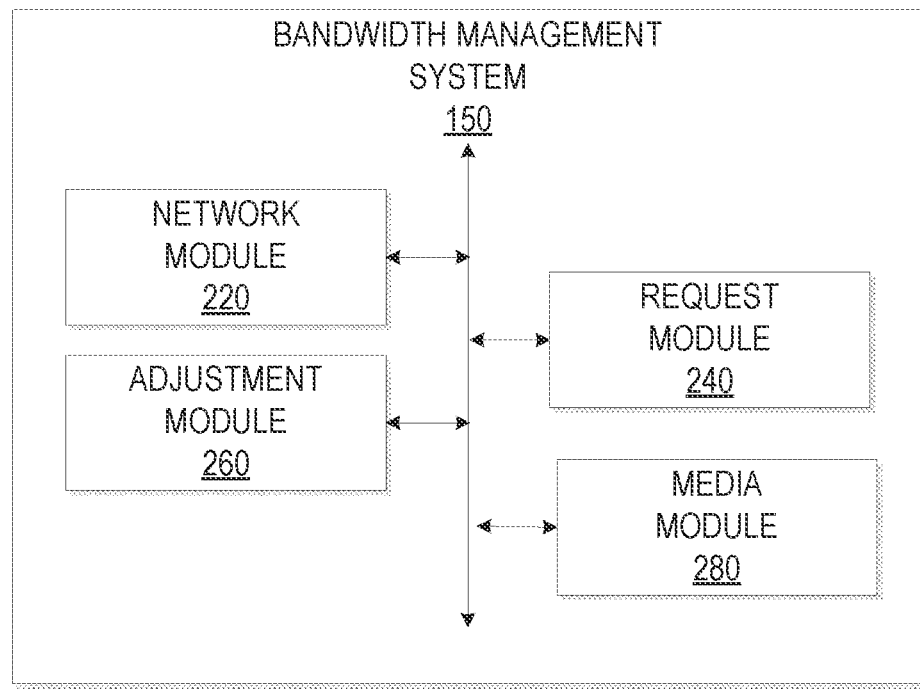
FIG. 2 is a block diagram illustrating an example embodiment of a system for managing media bandwidth.

FIG. 2 is a block diagram illustrating an example embodiment 200 of the bandwidth management system 150. In this example embodiment, the bandwidth management system 150 includes a network module 220, a request module 240, an adjustment module 260, and a media module 280.

In one example embodiment, the network module 220 determines a network connection state of the client device 110. In one example, a network connection of the client device 110 exhibits bandwidth capabilities that are below a threshold value. For example, where a threshold network transmission rate is 10 MB per second and previous transmission of media content to the client device 110 exhibited a network transmission speed below 10 MB per second, the network module 220 determines that the network connection state is limited to transmission of media content below 10 MB per second.

In another example embodiment, the network connection is a hardware 100 Mbit connection and the network module 220 determines that a network transmission rate for the network connection is 100 Megabits per second.

In another example embodiment, the network module 220 receives one or more values that identify a metered network connection. In one example, the network module 220 requests an indicator of a metered state of the network connection. For example, an operating system may transmit one or more indicators to the network module 220 that indicate a metered amount. In one example, the metered amount is one dollar per gigabyte. In another example, the metered amount is $0.10 per megabyte. Of course other metered amounts may be used, and this disclosure is meant to include all such amounts.

In another example embodiment, the network module 220 receives one or more indicators that identify disallowed media types. In one example, the network module 220 may receive an indicator that specifies that video media types are not allowed to be transmitted on the network connection. Of course, other media types may be disallowed on the network connection, and this disclosure is not limited in this regard.

In another example embodiment, the network module 220 receives one or more indicators from a user of the bandwidth management system 150 that indicate a user restriction for the network connection. For example, in one embodiment, the network module 220 queries an operating system using one or more libraries to determine a user restriction configured by the user. In one example, the user restriction is a transmission rate. In another example, the user restriction is a disallowed media type. In another example, the user restriction is an amount of data transmitted over the network connection over a certain period of time. In one example, the period of time is one day and the amount of data transmitted is one gigabyte. In this way the network module 220 identifies that the network connection is limited to one gigabyte of data transmitted per day. Of course other time periods or amounts of data may be used, and this disclosure is not limited in this regard.

In one example embodiment, the request module 240 is configured to receive a request from a user of the bandwidth management system 150. As one skilled in the art may appreciate, the request module 240 may receive the request from the user in a wide variety of different ways.

In one example, the user of the bandwidth management system 150 requests media content from a remote device. In one example, the network connection is the transmission medium to be used to transmit the media content. In one example, the user requests a web page from a remote web server. In another example, the user requests streaming media content from a remote media server, such as, but not limited to, audio, music, video, or the like.

In one example embodiment, the adjustment module 260 alters the request to request a synthetic representation of the media content instead of the media content in response to the network connection state being one of a set of predefined network connection states and the media content violating one or more restrictions of the network connection state.

In one example, the requested media content is a video, and the adjustment module 260 requests an animated image (one example of a synthetic representation of the video) representing the video instead of the actual video. In one example, this is in response to the network connection not allowing video content so that transmitting the media content over the network connection would violate a restriction of the network connection. In another example, the requested video exceeds a bandwidth limitation of the network connection such that transmitting the video violates a restriction of the network connection. In another example, the video size exceeds a threshold data amount for a period of time, as previously described.

In another example embodiment, the request module 240 identifies a category of the media content. For example, the request module 240 may request that a remote system identify a category for an image. In one example, the media content is an image of a tree. In this example, instead of requesting the image of the tree, the request module 240 indicates that the media content is an image of a tree. In response, the adjustment module 260 requests a generic image of a tree instead of the media content. Therefore, in certain embodiments, the synthetic representation is a simplified version of the requested media content. In one example, the synthetic representation is sufficiently similar to the requested media content that a user can determine the content of the requested media content based on the synthetic representation.

In one example embodiment, the generic image is locally stored and accessible by the bandwidth management system 150. In this way, the bandwidth management system 150 reduces bandwidth usage on the network connection by requesting a synthetic representation of media content instead of the media content in response to the media content violating one or more network connection restrictions.

Of course, other classes or categories of images may be used, and this disclosure is not limited in this regard. In certain examples, media content classes include, but are not limited to, car, plant, scenery, personal portrait, group of people, animal, certain type of animal, a building, other, or the like. In one example, the category or type of an image is determined based, at least in part, on a category of an auction product associated with the media content. In one example, an online auction for a car is requested by the user. In response, the adjustment module 260 modifies a request for an image of the product to a request for a generic image of a car. In one example, the synthetic representation is marked to indicate that it is a synthetic representation of the media content instead of the requested media content.

In another example embodiment, in response to the request module 240 receiving a request for media content and the media content violating one or more restrictions of the network connection state, the adjustment module 260 alters the request. In one example, the adjustment module 260 alters the request by requesting a lower resolution version of the media content. In another example embodiment, in response to successive requests for the media content, the adjustment module 260 requests successive versions of the media content with higher resolutions. In one example, the media content is an image. In response to an additional request for the image, the adjustment module 260 requests a higher resolution version of the image. In one example, the image's original resolution is 5000×5000. In response to a first request for the image, the adjustment module 260 requests a 100×100 version of the image. In response to a second request for the image, the adjustment module 260 alters the request to a request for a 500×500 version of the image. In response to a third request for the image, the adjustment module 260 may request a full-resolution version of the image. In other embodiments, the adjustment module 260 requests a reduced color depth for pixels in the image. Of course, one skilled in the art may recognize other ways to modify an image such that it consumes less data space, and the adjustment module 260 may request any such modifications of media content.

In one example embodiment, the network connection is kept open in order to transmit successive synthetic representations of a media content object. In this way delays associated with repetitive opening and closing of a network connection are avoided. In one example, metadata is included with each transmission of a synthetic representation media content so that the adjustment module 260 can consider the metadata to determine whether transmitting an additional synthetic representation would violate one or more restrictions of the network connection state to alter a request for media content. In one example, the adjustment module 240 determines a difference in size between a previous synthetic representation and an updated synthetic representation. In response to a subsequent media content object violating a restrictions of the network connection state, the adjustment module 260 may alter the request in any way described herein.

In another example embodiment, the adjustment module 260 alters the request to include metadata that describes the state of the network connection. In one example, the request is for a web page and the adjustment module 260 alters the request to indicate that the state of the network connection is restricted to not include images. In this example, the adjustment module 260 alters the request to indicate that the network connection is so restricted. In this way, the adjustment module 260 informs the remote web server that images are not to be included in a returned web page.

In another example embodiment, the adjustment module 260 alters the request based, at least in part, on a type of action performed by the user to request the media content. In one example, a single click that requests the media content is altered by the adjustment module 260 to request a low-resolution version of the media content, while a double click that requests the media content causes the adjustment module 260 to request a full-resolution version of the media content.

In another example embodiment, the adjustment module 260 alters a request for media content by requesting a text description of the media content to be displayed in place of the media content. In one example, the adjustment module 260 requests a size of the media content, an estimated time to download the media content, an estimated cost to download the media content, a category of the media content, a state of the media content, or a property of a product associated with the media content.

In one example, the adjustment module 260 estimates a time to download the media content in response to the network module 220 determining an estimated transmission speed for content being transmitted via the network connection. In this example, the adjustment module 260 divides the size of the media content by the transmission speed of the network connection to estimate a time to download the media content.

In another example, the network module 220 receives an indicator that the network connection is metered and the adjustment module 260 estimates a cost to download the media content by multiplying the size of the media content by the metered rate of the network connection.

In another example embodiment, the adjustment module 260 receives a preference from a user regarding which text values are to be included in a text overlay representing the media content. In one example, the user requests the size of the media content and an estimated cost to download the media content, and the adjustment module 260 includes those values in the text overlay that replaces the media content. In another example embodiment, the user preference includes a seller logo or other customized graphical element, or a custom seller message.

In one example embodiment, the adjustment module 260 partitions a synthetic representation into two or more portions and assigns the different portions to perform different operations in response to a user selecting a portion. In one example, selecting one portion causes the adjustment module 260 to request the originally requested media content while selecting another portion causes the adjustment module 260 to follow a link associated with the media content.

As one skilled in the art may appreciate, selecting a portion of the synthetic representation of the media content may include the user performing any number of actions or inputs. In one example, an input from a user is selected from a group consisting of a tap, a double tap, a drag, a pinch, a flick, a swipe, a touch and hold, a force touch, a shake, other inputs, or the like.

In another example embodiment, a single click causes the adjustment module 260 to request the originally requested media content and a long touch by the user causes the adjustment module 260 to follow a link associated with the media content. Other examples include a force touch above a certain threshold force resulting in a different operation than a force touch below the certain threshold force.

In one example embodiment, as the bandwidth management system 150 receives media content that may be requested by a user, the bandwidth management system 150 generates various synthetic representations for the media content. In certain examples, the synthetic representations include a drawing representing the media content, a cartoon that is similar to the media content, a text overlay that includes information about the media content, various resolutions of the media content, and an animated image for media content that is a video, other representations, or the like.

In one example embodiment, the media module 280 is configured to request the media content in response to the user selecting the synthetic representation in any one of the ways described herein.

In one example, the media content is an image of a product for sale. A user, using the bandwidth management system 150, submits a query where the product for sale is included in search results. The network module 220 determines that the network connection state is media size restrictions, because the user indicates a preference to not download media that is above a certain size using a mobile computing device and the mobile computing device reports a metered network connection. The adjustment module 260, in response to a restriction of the network connection not allowing media content that exceeds 1 Megabyte and a product image exceeding 1 Megabyte in size, alters the request to request a synthetic representation of the product image. In this example, the synthetic representation is a text overlay as described herein.

In response to the user selecting the synthetic representation (in this example, the text overlay), the media module 280 requests the media content. In response to the user selecting the media content, which replaced the synthetic representation, the media module 280 follows a link associated with the media content.

Figure 3:
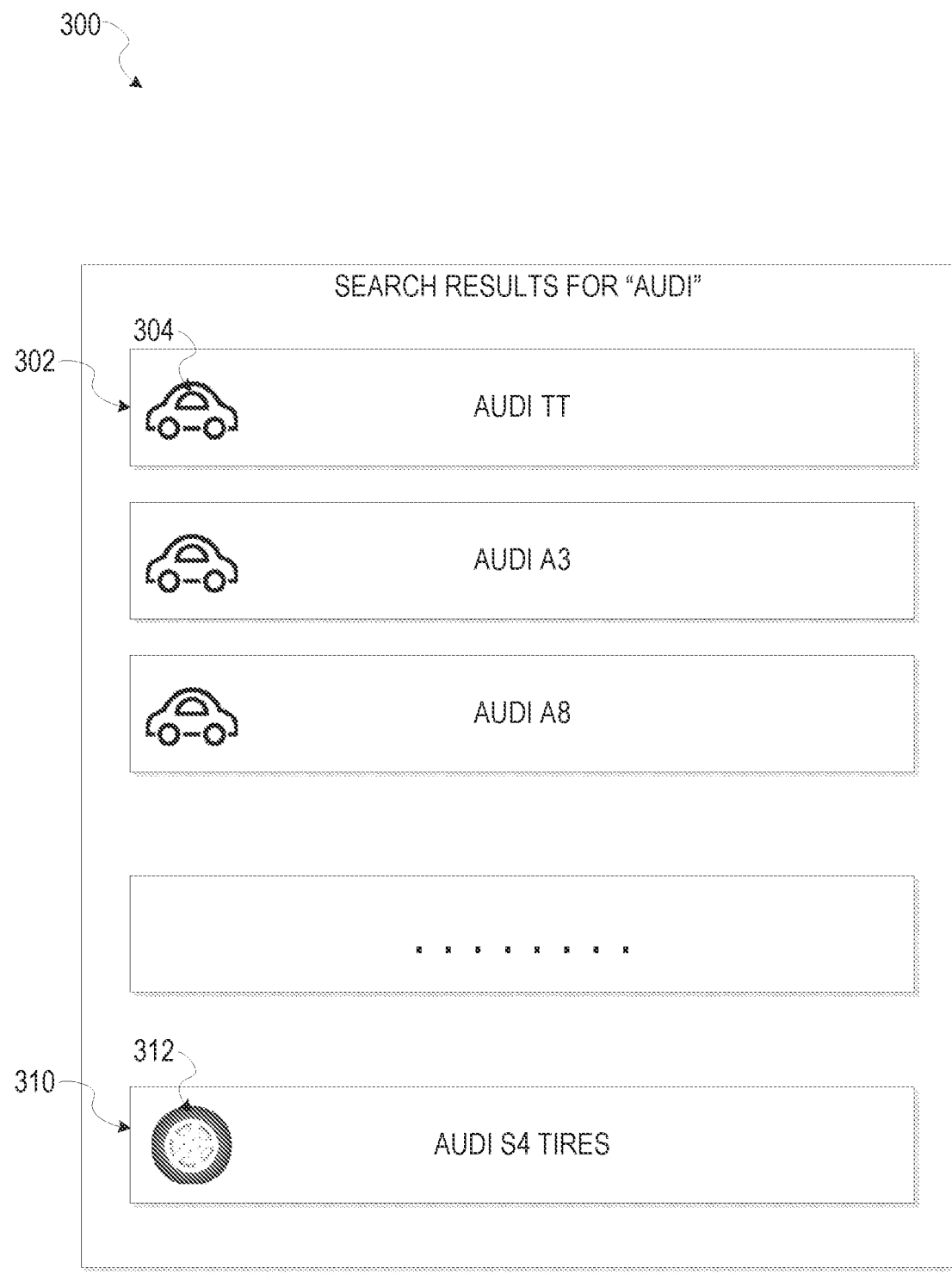
FIG. 3 is an illustration depicting a user interface, according to one example embodiment.

FIG. 3 is an illustration 300 depicting a resulting user interface, according to one example embodiment. In this example embodiment, the network module 220 determines that the network connection state is limited bandwidth and the user queries for products available for purchase at an online marketplace using a search term "Audi." In this example, the adjustment module 260 modifies the query to indicate a preference for synthetic representations of images associated with search results.

In one example embodiment, a product 302 in the search results includes an Audi TT, which is an automobile. In this example, the synthetic representation is a generic image 304 of an automobile because the product is an automobile. Another product 310 in the search results includes tires for an Audi, and the synthetic representation is a generic image 312 of tires because the product is in a "tires" category. In one example embodiment, in response to a user selecting the generic image 304, the media module 280 requests the media content which is the originally submitted image of the product 302 for sale.

Figure 4:
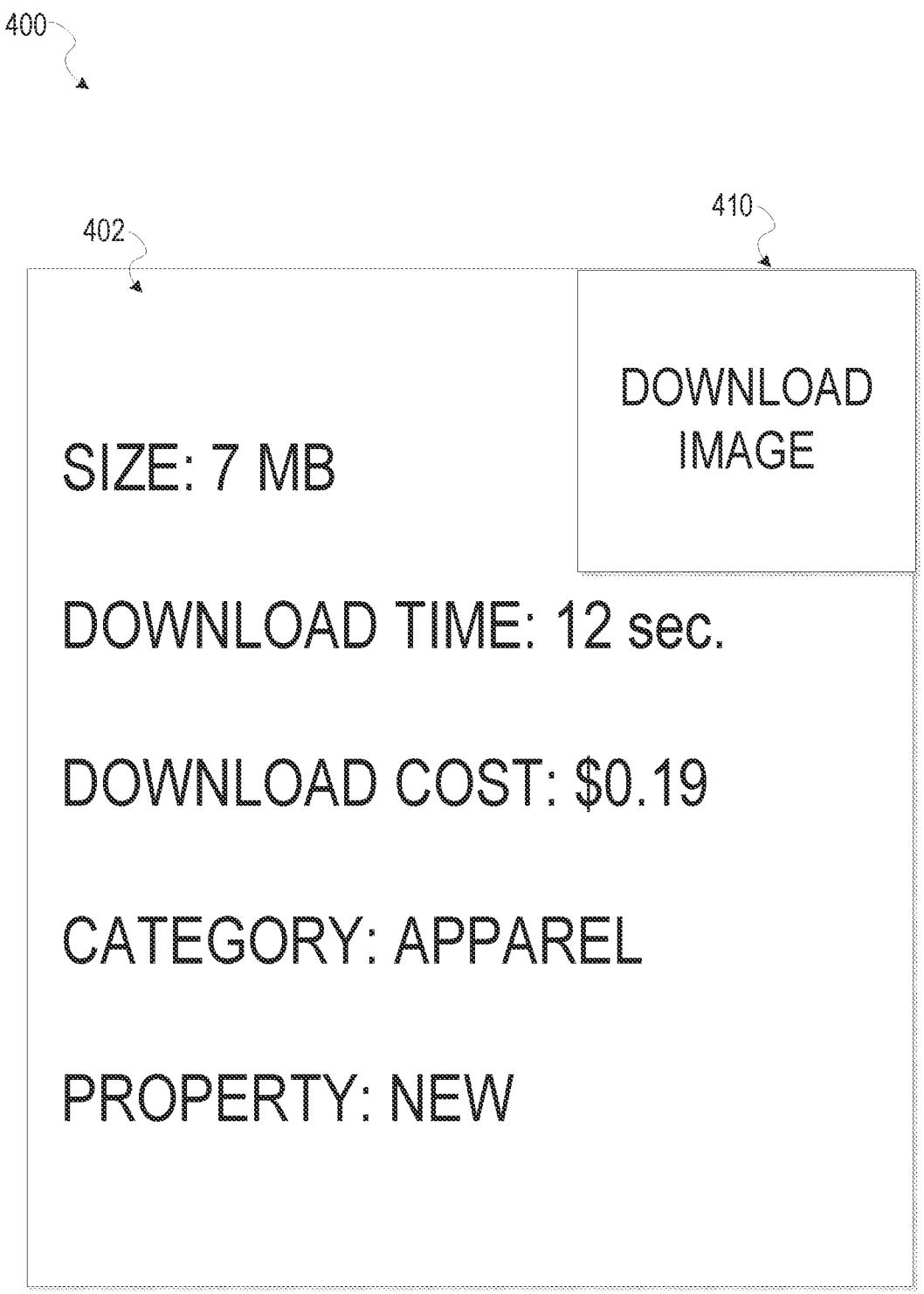
FIG. 4 is an illustration depicting one example of a text overlay, according to one embodiment.

FIG. 4 is an illustration 400 depicting one example of a text overlay, according to one embodiment. In this example embodiment, the adjustment module 260 partitions a synthetic representation (e.g., an image) into a first portion 402 and a second portion 410.

In one example embodiment, in response to the user selecting the second portion 410, the media module 280 requests the original media content. In response to the user selecting the first portion 402, the media module 280 follows a link associated with the synthetic representation. In this example embodiment, the synthetic representation is an image that includes a text overlay depicting various properties of the media content and/or properties of a product associated with the media content.

In another example embodiment, the text overlay indicates that the size of the media content is 7 Megabytes, an estimated download time is 12 seconds, an estimated download cost is 19 cents, the category of the product associated with the media content is "Apparel," and the product associated with the media content is "new."

Figure 5:
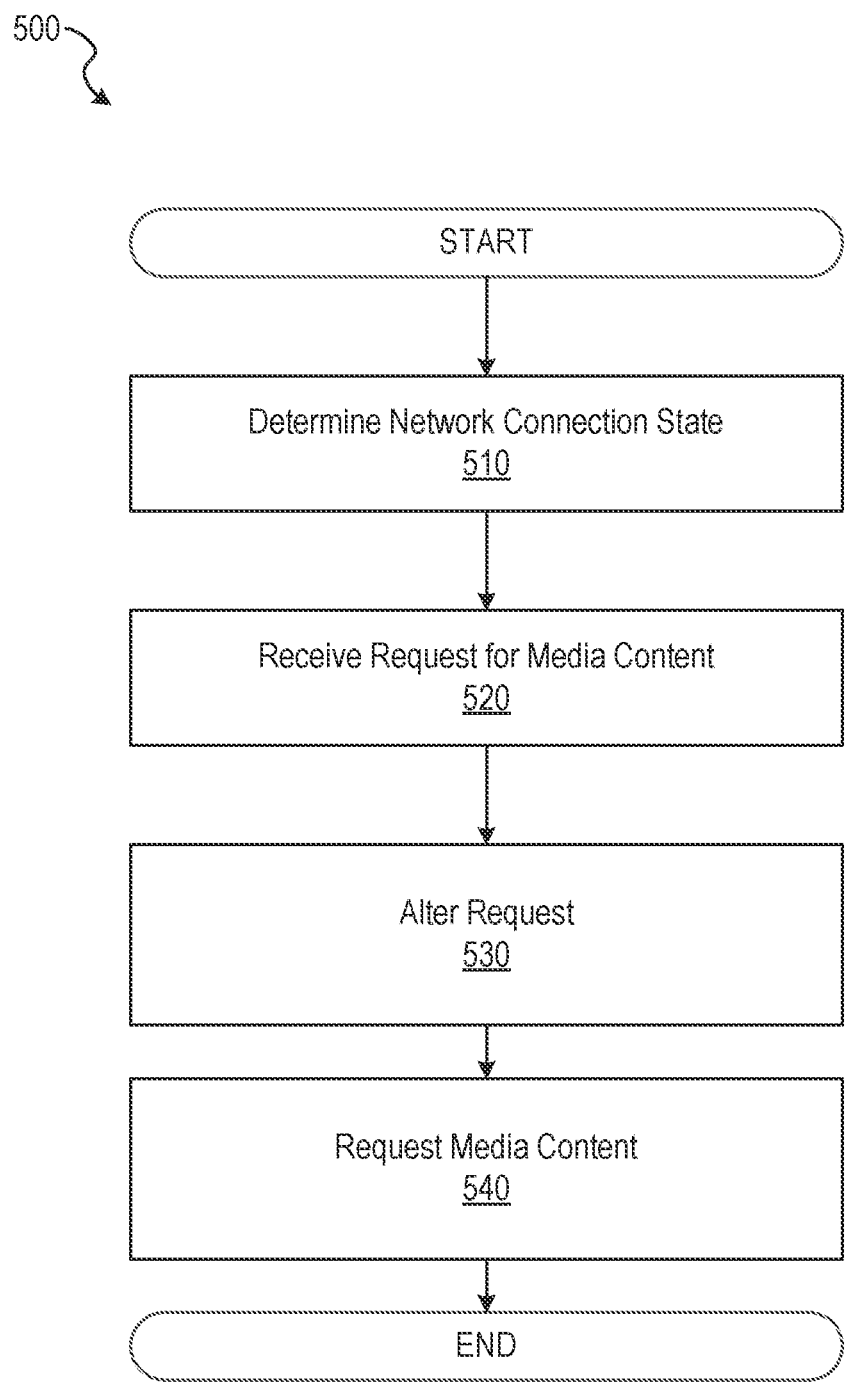
FIG. 5 is a flow diagram illustrating a method for managing media bandwidth, according to one example embodiment.

FIG. 5 is a flow diagram illustrating a method 500 for managing media bandwidth, according to one example embodiment. Operations in the method 500 may be performed by the bandwidth management system 150, using modules described above with respect to FIG. 2. As shown in FIG. 5, the method 500 includes operations 510, 520, 530, and 540.

In one example embodiment, the method 500 begins and at operation 510, the network module 220 determines a network connection state of the system performing the method 500. In one example, the network module 220 determines that the network connection is in a state that restricts certain media content type.

The method 500 continues at operation 520 and the request module 240 receives a request, from a user of the system, for media content via the network connection. In one example, the user queries for products for sale at an online marketplace.

The method 500 continues at operation 530 and the adjustment module 260 alters the request to request a synthetic representation of the media content instead of the media content in response to the network connection state being one of a set of predefined network connection states and the media content violating one or more restrictions of the network connection state. In one example, the network connection state includes videos not being allowed and the media type requested is a video. In response, the adjustment module 260 requests an animated image instead of the video. In another example embodiment, at least one frame of the animated image includes a text overlay presenting information about the media content.

The method 500 continues at operation 540 and the media module 280 requests the media content in response to the user selecting the synthetic representation. In one example, the user selects a text overlay representing an image and the media module 280 requests the image in response to the user selecting the text overlay. In another example embodiment, in response to the user selecting the synthetic representation a second time, the media module 280 follows a link associated with the media content.

Figure 6:
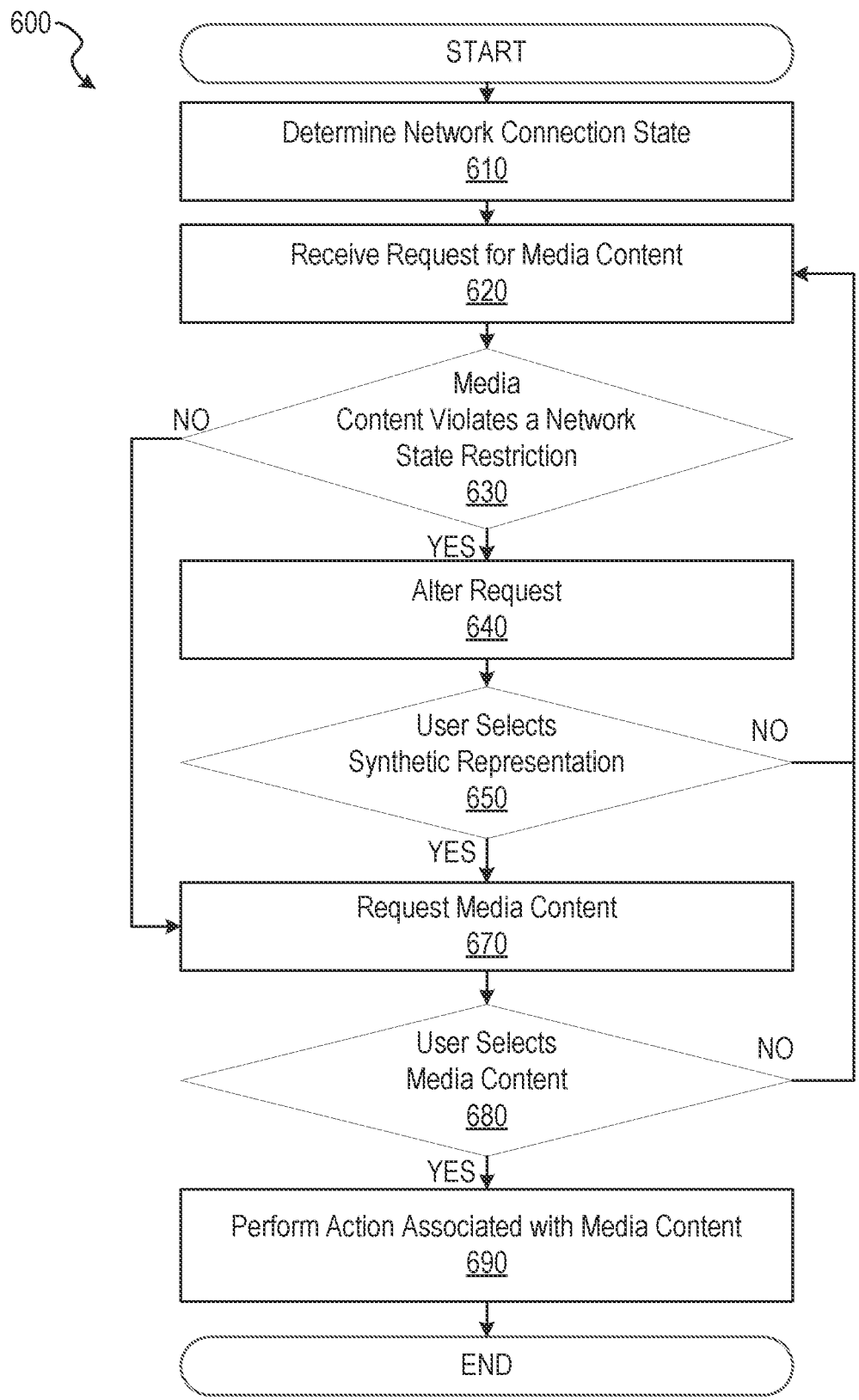
FIG. 6 is a flow diagram illustrating a method for managing media bandwidth, according to one example embodiment.

FIG. 6 is a flow diagram illustrating a method 600 for managing media bandwidth, according to one example embodiment. Operations in the method 600 may be performed by the bandwidth management system 150, using modules described above with respect to FIG. 2. As shown in FIG. 6, the method 600 includes operations 610, 620, 630, 640, 650, 670, 680, and 690.

In one example embodiment, the method 600 begins and at operation 610, the network module 220 determines a network connection state of the system performing the method 600. In one example, the network module 220 determines that the network connection state is bandwidth limited below a threshold transmission speed.

The method 600 continues at operation 620 and the request module 240 receives a request for media content via the network connection. The method 600 continues and at operation 630, the request module 240 determines whether the requested media content violates a restriction of the network connection state. In one example, the request is for a video that exceeds the threshold transmission speed of the network connection state. In response to the video not exceeding the threshold transmission speed, the method 600 continues at operation 670.

In response to the video exceeding the threshold transmission speed, the method 600 continues at operation 640 and the adjustment module 260 alters the request to request a synthetic representation of the media content instead of the media content. In one example, the network connection state includes a user restriction that images are not to be transmitted via the network connection. In response, the adjustment module 260 requests a generic image that is loaded from local storage instead of downloading the image.

The method 600 continues at operation 650 and the media module 280 determines whether the user selected the synthetic representation. In response to the user not selecting the synthetic representation, the method 600 continues at operation 620. In response to the user selecting the synthetic representation, the method 600 continues at operation 670.

At operation 670, the media module 280 requests the media content. The method 600 continues at operation 680 and the media module 280 determines whether the user selects the media content. In response to the user not selecting the media content, the method 600 continues at operation 620. In response to the user selecting the media content, the method 600 continues at operation 690 and the media module 280 performs an action associated with the media content. In one example, the media module 280 follows a link associated with the media content.

Figure 7:
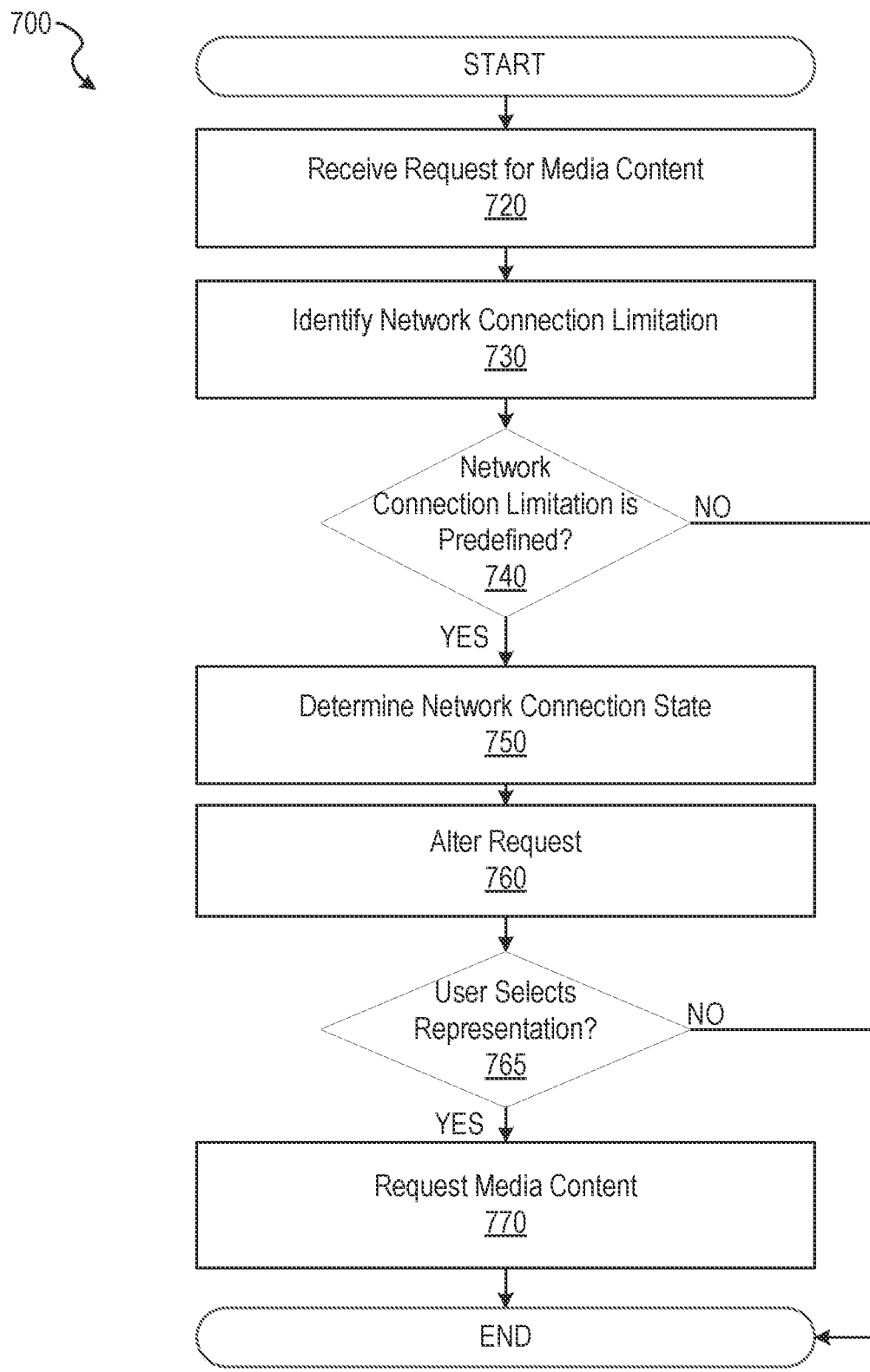
FIG. 7 is a flow diagram illustrating a method for managing media bandwidth, according to one example embodiment.

FIG. 7 is a flow diagram illustrating a method 700 for managing media bandwidth, according to one example embodiment. Operations in the method 700 may be performed by the bandwidth management system 150, using modules described above with respect to FIG. 2. As shown in FIG. 7, the method 700 includes operations 720, 730, 740, 750, 760, and 770.

In one example embodiment, the method 700 begins and at operation 720, the request module 240 receives a request for media content via a network connection. The method 700 continues at operation 730 and the network module 220 determines a network connection limitation of the system performing the method 700. In one example, the network connection limitation of the network connection state is a user limitation that restricts audio media content during a specific period of time.

The method 700 continues at operation 740 and the network module 220 determines whether the network connection limitation is predefined. In response to the network connection limitation not being predefined, the method 700 continues at operation 770. In response to the network connection limitation being predefined, the method 700 continues at operation 750 and the network module 220 determines a network connection state based, at least in part, on the network connection limitation. In one example, an audio media limitation based on time of day is a predefined network connection limitation, and in response, the network module 220 determines that the network connection limitation is predefined.

The method 700 continues at operation 760 and the adjustment module 260 alters the request to request a synthetic representation of the media content instead of the media content. In one example, a synthetic representation of audio media content is a textual representation of words spoken in the audio media content. The method 700 continues at operation 765 and the adjustment module 260 determines whether the user selected the synthetic representation.

In response to the user not selecting the synthetic representation, the method 700 ends. In response to the user selecting the synthetic representation, the method continues at operation 770. At operation 770 and the media module 280 requests the media content in response to the user selecting the synthetic representation.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time.

For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 2-7 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 8:
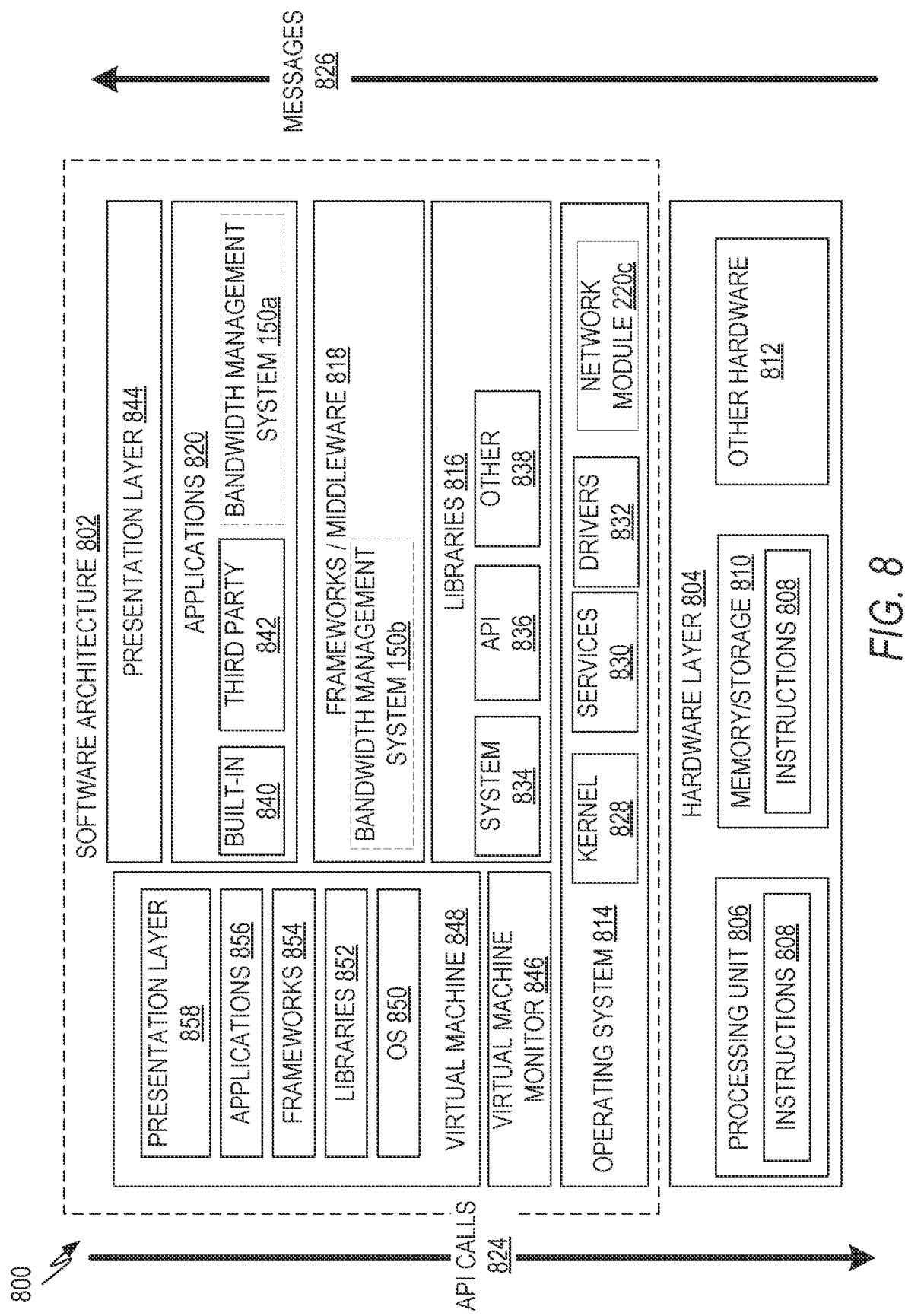
FIG. 8 is a block diagram illustrating an example of a software architecture that may be installed on a machine, according to some example embodiments.

FIG. 8 is a block diagram illustrating an example of a software architecture 802 that may be installed on a machine, according to some example embodiments. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated in FIG. 8 and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 2-7. The hardware layer 804 also includes memory and/or storage modules 810, which also have the executable instructions 808. The hardware layer 804 may also comprise other hardware 812 which represents any other hardware of the hardware layer 804, such as the other hardware illustrated as part of the machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke API calls 824 through the software stack and receive a response, returned values, and so forth illustrated as messages 826 in response to the API calls 824. The layers illustrated are representative in nature and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. In another example embodiment, the network module 220 is implemented as part of the operating system 814. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules. In one example embodiment, the network module 220 communicates with a library via an API to determine a network connection limitation.

In one example embodiment, the bandwidth management system 150a is implemented as an application 820. In another example embodiment, the bandwidth management system 150b is implemented as a framework and/or middleware 818. In one example embodiment, the network module 22c is implemented as part of the operating system 814.

The frameworks/middleware 818 layer may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system 814 or platform.

The applications 820 include built-in applications 840 and/or third party applications 842. Examples of representative built-in applications 840 may include, but are not limited to, a contacts application, a browser application, a book reader application, a location application, a media application, a messaging application, and/or a game application. The third party applications 842 may include any of the built-in applications 840 as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system, such as operating system 814, to facilitate functionality described herein.

The applications 820 may utilize built-in operating system functions (e.g., kernel 828, services 830, and/or drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

In one example embodiment, the bandwidth management system 150a is implemented as an application 820. In another example, each of the modules of the bandwidth management system 150 is implemented as one or more applications 820 that communicate with each other as described in FIG. 6.

Some software architectures utilize virtual machines. In the example of FIG. 8, this is illustrated by a virtual machine 848. A virtual machine creates a software environment where applications/modules can execute as if they were executing on a hardware machine (such as the machine 900 of FIG. 9, for example). A virtual machine is hosted by a host operating system (e.g., operating system 814 in FIG. 8) and typically, although not always, has a virtual machine monitor 846, which manages the operation of the virtual machine as well as the interface with the host operating system (e.g., operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Example Machine Architecture and Machine-Readable Medium

Figure 9:
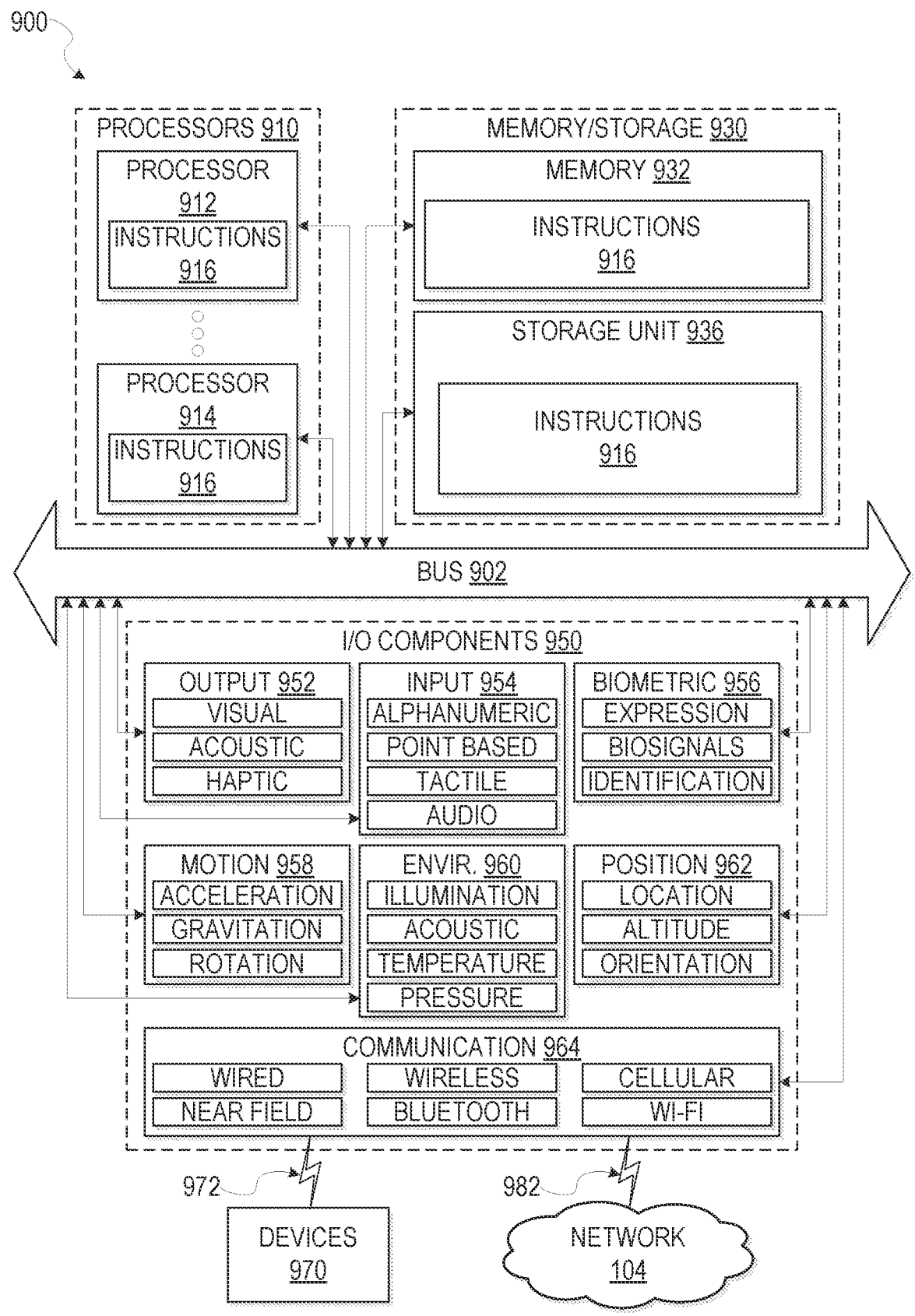
FIG. 9 is a diagrammatic representation of a machine in the form of a computer system within which a set of instructions may be executed for causing the machine to perform any one or more of the methodologies discussed herein, according to an example embodiment.

FIG. 9 is a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagrams of FIGS. 5-7. Additionally, or alternatively, the instructions 916 may implement the network module 220, the request module 240, the adjustment module 260, and/or the media module 280 of FIG. 2, and so forth. The instructions 916 transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include a multi-core processor that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 962 may include location sensor components (e.g., Global Position System (GPS) receiver components), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 104 or devices 970 via a coupling 982 and a coupling 972 respectively. For example, the communication components 964 may include a network interface component or other suitable device to interface with the network 104. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 104 or a portion of the network 104 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 104 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more processors; and
memory including instructions that, upon execution by the one or more processors, cause the system to perform operations comprising:
receiving, via a network from a computing device, download preferences from a user of the computing device;
determining, based on the download preferences, which of one or more of a plurality of network connection state restrictions to apply to requests from the user, wherein:
at least a first one of the network connection state restrictions is based at least in part on an amount of data to be provided in response to a request from the computing device, and
at least a second one of the network connection state restrictions disallows specified media types from being provided in response to the request from the computing device;
receiving, via the network from the computing device, a request to retrieve an image in a first resolution for the computing device;
determining that communicating the requested image in the first resolution violates at least one of the one or more network connection state restrictions for a network connection with the computing device;
based on the requested image in the first resolution violating the at least one of the one or more network connection state restriction, determining to alter the request by requesting the image in a second resolution that is lower than the first resolution;
retrieving the image in the second resolution based on an altered request; and
causing presentation of the image in the second resolution at the computing device.

2. The system of claim 1, wherein the instructions are further executable by the one or more processors to cause the system to perform operations comprising:
generating the altered request by altering the request to retrieve the image in the second resolution that is lower than the first resolution.

3. The system of claim 1, wherein the instructions are further executable by the one or more processors to cause the system to perform operations comprising:
receiving a second request to retrieve the image in a third resolution that is higher than the second resolution and lower that the first resolution;
retrieving the image in the third resolution; and
causing presentation of the image in the third resolution at the computing device.

4. The system of claim 1, wherein the instructions are further executable by the one or more processors to cause the system to perform operations comprising:
receiving, from the computing device and in response to causing presentation of the image in the second resolution at the computing device, a second request to retrieve the image in the first resolution;
retrieving the image in the first resolution; and
causing presentation of the image in the first resolution at the computing device.

5. The system of claim 1, wherein the instructions are further executable by the one or more processors to cause the system to perform operations comprising:
receiving a download request for the image subsequent to causing presentation of the image in the second resolution at the computing device; and
communicating, to the computing device via the network connection, the image in the first resolution.

6. The system of claim 1, wherein the instructions causing presentation of the image in the second resolution at the computing device are further executable by the one or more processors to cause the system to perform operations comprising:
causing the computing device to display a search result comprising the image in the second resolution at the computing device.

7. A computer-implemented method comprising:
receiving, via a network from a computing device, download preferences from a user of the computing device;
determining, based on the download preferences, which of one or more of a plurality of network connection state restrictions to apply to requests from the user, wherein:
at least a first one of the network connection state restrictions is based at least in part on an amount of data to be provided in response to a request from the computing device, and
at least a second one of the network connection state restrictions disallows specified media types from being provided in response to the request from the computing device;
receiving, via the network from the computing device, a request to retrieve an image in a first resolution for the computing device;
determining, by one or more processors, that communicating the requested image in the first resolution violates at least one of the one or more network connection state restrictions for a network connection with the computing device;
based on the requested image in the first resolution violating the at least one of the one or more network connection state restriction, determining to alter the request by requesting the image in a second resolution that is lower than the first resolution;
retrieving the image in the second resolution based on an altered request; and
causing presentation of the image in the second resolution at the computing device.

8. The computer-implemented method of claim 7, further comprising:
generating the altered request by altering the request to retrieve the image in the second resolution that is lower than the first resolution.

9. The computer-implemented method of claim 7, further comprising:
receiving a second request to retrieve the image in a third resolution that is higher than the second resolution and lower that the first resolution;
retrieving, by the one or more processors, the image in the third resolution; and
causing presentation of the image in the third resolution at the computing device.

10. The computer-implemented method of claim 7, further comprising:
receiving, from the computing device and in response to causing presentation of the image in the second resolution at the computing device, a second request to retrieve the image in the first resolution;
retrieving, by the one or more processors, the image in the first resolution; and
causing presentation of the image in the first resolution at the computing device.

11. The computer-implemented method of claim 7, further comprising:
- receiving a download request for the image subsequent to causing presentation of the image in the second resolution at the computing device; and
- communicating, to the computing device via the network connection, the image in the first resolution.

12. The computer-implemented method of claim 7, wherein causing presentation of the image in the second resolution at the computing device comprises:
- causing the computing device to display a search result comprising the image in the second resolution at the computing device.

13. A non-transitory computer-readable medium storing code comprising instructions executable by one or more processors to perform operations comprising:
- receiving, via a network from a computing device, download preferences from a user of the computing device;
- determining, based on the download preferences, which of one or more of a plurality of network connection state restrictions to apply to requests from the user, wherein:
  - at least a first one of the network connection state restrictions is based at least in part on an amount of data to be provided in response to a request from the computing device, and
  - at least a second one of the network connection state restrictions disallows specified media types from being provided in response to the request from the computing device;
- receiving, via the network from the computing device, a request to retrieve an image in a first resolution for the computing device;
- determining that communicating the requested image in the first resolution violates at least one of the one or more network connection state restrictions for a network connection with the computing device;
- based on the requested image in the first resolution violating the at least one of the one or more network connection state restriction, determining to alter the request by requesting the image in a second resolution that is lower than the first resolution;
- retrieving the image in the second resolution based on an altered request; and
- causing presentation of the image in the second resolution at the computing device.

14. The non-transitory computer-readable medium of claim 13, wherein the instructions are further executable by the one or more processors to perform operations comprising:
- generating the altered request by altering the request to retrieve the image in the second resolution that is lower than the first resolution.

15. The non-transitory computer-readable medium of claim 13, wherein the instructions are further executable by the one or more processors to perform operations comprising:
- receiving a second request to retrieve the image in a third resolution that is higher than the second resolution and lower that the first resolution;
- retrieving, by the one or more processors, the image in the third resolution; and
- causing presentation of the image in the third resolution at the computing device.

16. The non-transitory computer-readable medium of claim 13, wherein the instructions are further executable by the one or more processors to perform operations comprising:
- receiving, from the computing device and in response to causing presentation of the image in the second resolution at the computing device, a second request to retrieve the image in the first resolution;
- retrieving, by the one or more processors, the image in the first resolution; and
- causing presentation of the image in the first resolution at the computing device.

17. The non-transitory computer-readable medium of claim 13, wherein the instructions are further executable by the one or more processors to perform operations comprising
- receiving a download request for the image subsequent to causing presentation of the image in the second resolution at the computing device; and
- communicating, to the computing device via the network connection, the image in the first resolution.

18. The non-transitory computer-readable medium of claim 13, wherein causing presentation of the image in the second resolution at the computing device comprises:
- causing the computing device to display a search result comprising the image in the second resolution at the computing device.

* * * * *